United States Patent
Duffy et al.

(10) Patent No.: US 8,529,135 B2
(45) Date of Patent: Sep. 10, 2013

(54) ANGULAR CONTACT BALL BEARING

(75) Inventors: Kevin Duffy, Somers, CT (US); Sean McCutchan, Glastonbury, CT (US)

(73) Assignee: United Technologies Corporation, Hartford, CT (US)

( * ) Notice: Subject to any disclaimer, the term of this patent is extended or adjusted under 35 U.S.C. 154(b) by 83 days.

(21) Appl. No.: 13/217,392

(22) Filed: Aug. 25, 2011

(65) Prior Publication Data
US 2013/0051717 A1 Feb. 28, 2013

(51) Int. Cl.
*F16C 33/38* (2006.01)
*F16C 19/16* (2006.01)
*F16C 33/66* (2006.01)

(52) U.S. Cl.
USPC ........... 384/470; 384/385; 384/462; 384/523; 384/572

(58) Field of Classification Search
USPC ................ 384/385, 462, 466, 470, 490, 523, 384/560, 572
See application file for complete search history.

(56) References Cited

U.S. PATENT DOCUMENTS

| | | | | |
|---|---|---|---|---|
| 2,219,031 A | * | 10/1940 | Frauenthal et al. | 384/572 |
| 2,838,348 A | * | 6/1958 | Hamm | 384/466 |
| 3,195,965 A | * | 7/1965 | Van Dorn | 384/475 |
| 3,539,231 A | * | 11/1970 | Langstrom | 384/470 |
| 3,951,476 A | * | 4/1976 | Schulien et al. | 384/465 |
| 3,989,326 A | | 11/1976 | Hormann et al. | |
| 4,319,789 A | * | 3/1982 | Irwin | 384/450 |
| 4,345,799 A | | 8/1982 | Crofts | |
| 4,400,040 A | * | 8/1983 | Toth et al. | 384/465 |
| 4,799,807 A | | 1/1989 | Kuroiwa | |
| 5,125,756 A | | 6/1992 | Bossler, Jr. | |
| 5,312,191 A | * | 5/1994 | Gallant | 384/470 |
| 5,410,809 A | | 5/1995 | Alling | |
| 6,371,655 B1 | * | 4/2002 | Fierling | 384/523 |
| 6,409,464 B1 | | 6/2002 | Fisher et al. | |
| 6,533,462 B2 | * | 3/2003 | Kawakami | 384/470 |
| 7,507,028 B2 | * | 3/2009 | Markle | 384/523 |
| 7,909,513 B2 | * | 3/2011 | Ueno et al. | 384/470 |
| 7,931,407 B2 | * | 4/2011 | Begin et al. | 384/475 |
| 2006/0193545 A1 | | 8/2006 | Bridges et al. | |
| 2008/0069488 A1 | * | 3/2008 | Ueno et al. | 384/470 |
| 2009/0060407 A1 | * | 3/2009 | Tachi et al. | 384/533 |

FOREIGN PATENT DOCUMENTS

| | | | |
|---|---|---|---|
| JP | 11082516 A | * | 3/1999 |
| JP | 2007032612 A | * | 2/2007 |
| JP | 2007315412 A | * | 12/2007 |
| JP | 2008261478 A | * | 10/2008 |

* cited by examiner

*Primary Examiner* — Marcus Charles
(74) *Attorney, Agent, or Firm* — Carlson, Gaskey & Olds, P.C.

(57) ABSTRACT

An angular contact ball bearing, and a method for lubricating the same, has multiple ball pockets connected to an annulus channel via at least one hole that allows a fluid to flow from the annulus channel to the ball pockets.

17 Claims, 2 Drawing Sheets

ANGULAR CONTACT BALL BEARING

BACKGROUND

The present disclosure relates generally to bearing assemblies and more particularly, to a bearing cage for an angular contact ball bearing assembly.

Bearing assemblies are often used in engines to facilitate rotational movement of engine components. In particular, angular contact ball bearings are frequently used in gas turbine engines to support rotating engine components. The high speed rolling element bearings include multiple rolling elements contained within a bearing cage. The rotation of the rolling elements within the bearing cage causes friction between the rolling elements and any bearing components contacting the rolling elements. In order to reduce the effects of friction, and to remove heat generated by friction, the rotating components within the bearings are lubricated and cooled by injecting oil or another coolant into the portion of the bearing cage holding the rotating element.

Current bearing cage designs utilize channels etched into a bearing cage land surface that simultaneously provide lubricant to the bearing cage land surface and to the rotating elements of the bearing assembly.

SUMMARY

Disclosed is an angular contact ball bearing having a bearing cage. The bearing cage has a plurality of ball pockets, an annulus channel running circumferentially through the bearing cage relative to an axis defined by the bearing cage, and at least one hole connecting one of the plurality of ball pockets to the annulus channel.

Also disclosed is a method for lubricating an angular contact ball bearing including the steps of injecting oil into an annulus channel, and passing oil from the annulus channel into a ball pocket through a hole connecting the annulus channel to a ball pocket, thereby lubricating the ball pocket.

Also disclosed is a ball bearing cage having an annulus channel, a plurality of ball pockets for holding ball bearing elements, and a plurality of holes. Each of the ball pockets is connected to the annulus channel via at least one of the holes.

DETAILED DESCRIPTION OF THE INVENTION

Figure 1:
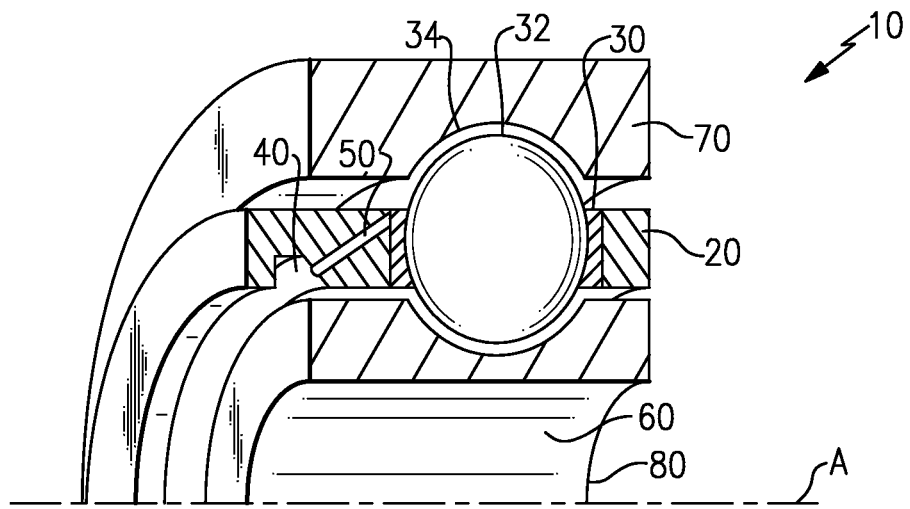
FIG. 1 illustrates an example view of a rolling element bearing.

FIG. 1 illustrates an example ball bearing assembly 10 that has a bearing cage 20. The bearing cage 20 includes multiple ball pockets 30 each of which contains a ball bearing element 32. The bearing cage 20 is cylindrical and defines an axis A. The bearing cage 20 also includes an annulus channel 40 running circumferentially through the bearing cage 20 relative to the axis A. The annulus channel 40 is connected to each ball pocket 30 by a hole 50. An outer bearing ring 70 surrounds the exterior of the bearing cage 20 and an interior bearing ring 80 is positioned inside the bearing cage 20. Each of the outer bearing ring 70 and the inner bearing ring 80 includes a raceway 34 to allow rotation of the inner and outer bearing rings 70, 80 about the axis A. The rotation of the inner and outer bearing rings 70 causes the ball bearing element 32 to also rotate. FIG. 1 is not drawn to scale, and certain features such as the gaps between the bearing cage 20 and the inner and outer bearing rings 70, 80 are exaggerated for explanatory purposes.

Lubricant or oil can be injected into the annulus channel 40 and centrifugal force due to the rotation of the bearing elements 20, 70, 80, forces the lubricant or oil through the holes 50 connecting the annulus channel 40 to each ball pocket 30 and into the ball pockets 30. Once the lubricant or oil reaches the ball pocket 30, the rotation of the ball bearing element 32 spreads the lubricant or oil across the ball bearing element 32 surface, thereby lubricating the bearing assembly 10.

Figure 2:
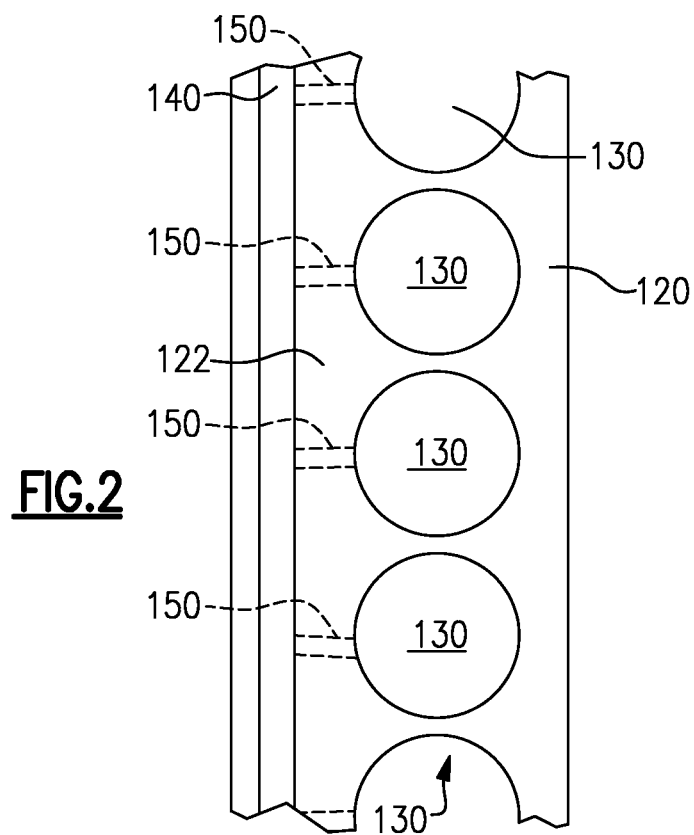
FIG. 2 illustrates a flattened view of the bearing cage of the rolling element bearing of FIG. 1.

A flattened internal view of the bearing cage 20 is illustrated as bearing cage 120 in FIG. 2. The view of FIG. 2 illustrates the interior surface of the bearing cage 120, the multiple ball pockets 130, and the annulus channel 140. The holes 150 connecting the annulus channel 140 to each of the ball pockets 130 are illustrated using hidden lines, as the holes 150 pass through the bearing cage 120 rather than intersecting either the inner or outer surface of the bearing cage 120.

By passing the holes 150 through the bearing cage 120, lubricant or cooling oil can be delivered to the ball pocket 130 from the annulus channel 140 without causing additional breaks in the surface area of the bearing cage lands 122. Breaks in the surface area of the bearing cage lands 122, such as would be present with surface channels instead of holes 150, adds the possibility of wear, when the bearing cage 120 contacts the inner ring 80. The additional wear can cause the bearing to fail prematurely.

Figure 3:
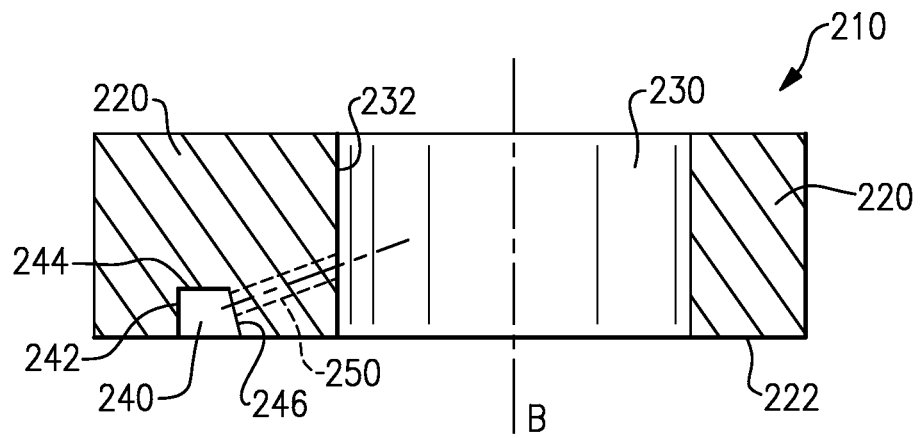
FIG. 3 illustrates a cutout end view of the bearing cage of the rolling element bearing of FIG. 1.
Figure 4:
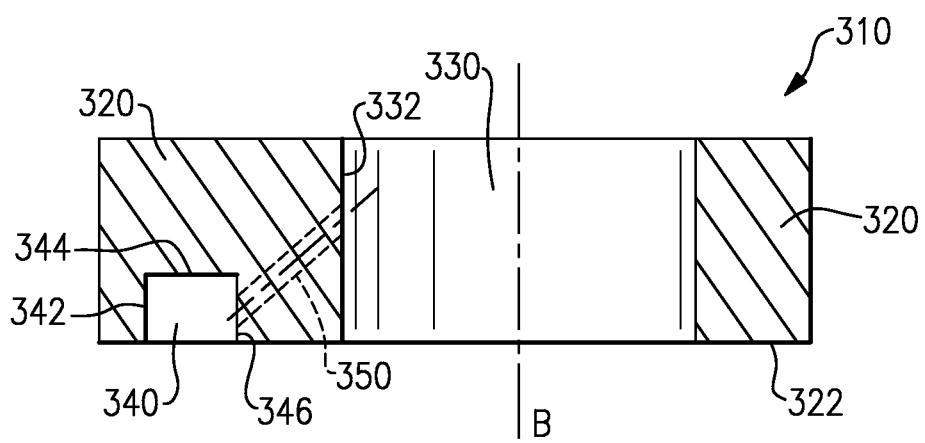
FIG. 4 illustrates a cutout end view of an alternative embodiment of the bearing cage of the rolling element bearing of FIG. 1.

FIGS. 3 and 4 illustrate a cutout side view of two example bearing cages 120, illustrated as bearing cages 210 and 310. The example bearing cages 210, 310 can each be used as the bearing cage 20 in the example of FIG. 1. The bearing cages 210, 310 include cylindrical hole shaped ball pockets 230, 330, with each of the ball pockets 230, 330 defining an axis B. Each bearing cage 210, 310 additionally includes an annulus channel 240, 340 and a hole 250, 350 connecting the annulus channel 240, 340 to the illustrated ball pocket 230, 330. An interior cage land surface 222, 322, is illustrated as the bottom surface. The interior cage land surface 222, 322 faces the inner bearing ring 80 in the assembly of FIG. 1, and can incidentally contact the inner bearing ring 80 (illustrated in FIG. 1) during standard use. As illustrated in FIGS. 3 and 4, each of the annulus channels 240, 340 includes a far wall 242, 342 on the edge of the annulus channel 240, 340 farthest away from the ball pocket 230, 330 and a base wall 244, 344 approximately parallel to the cage land surface 222, 322.

The third annulus channel wall 246 illustrated in FIG. 3 is angled away from the ball pocket 230 interior wall 232 such that the third annulus channel wall 246 provides an angled surface for intersecting with the hole 250. As an alternate embodiment, the third annulus channel wall 346 is approximately parallel to the axis B defined by the ball pocket 330 as is illustrated in FIG. 4. Additional alternative annulus channel shapes could also be used depending on manufacturing concerns and still fall within the above disclosure.

Additionally, the hole 250, 350 connecting the annulus channel 240, 340 to the ball pocket 230, 330 is angled relative to both the interior cage land surface 222, 322 and the axis B. The particular angle of the hole 250, 350 can be varied depending on manufacturing concerns, provided neither the ball pocket 230, 330 intersection nor the annulus channel 240, 340 intersection intersects with the interior cage land surface

222, 322 or the exterior cage land surface. Furthermore, the hole 250, 350 connecting the annulus channel 240, 340 to the ball pocket 230, 330 could alternatively be approximately parallel to the interior cage land surface 222, 322.

Although embodiments of this invention have been disclosed, a worker of ordinary skill would recognize that certain modifications would come within the scope of this invention. For that reason, the following claims should be studied to determine the true scope and content of this invention.

What is claimed is:

1. An angular contact ball bearing comprising:
   a bearing cage having a plurality of ball pockets;
   an annulus channel running circumferentially through said bearing cage relative to an axis defined by said bearing cage, wherein said annulus channel includes a first wall approximately parallel a cage land surface, a second wall approximately parallel to a ball pocket wall, and a third wall angled relative to said cage land surface and angled relative to said ball pocket wall, said third wall being axially closer to said ball pocket wall than said second wall, relative to said axis defined by said bearing cage; and
   at least one hole connecting one of said plurality of ball pockets to said annulus channel.

2. The angular contact ball bearing of claim 1, wherein said bearing cage further comprises a cage land surface and said cage land surface is interrupted only by said ball pockets and said annulus channel.

3. The angular contact ball bearing of claim 1, wherein said at least one hole is angled relative to a cage land surface.

4. The angular contact ball bearing of claim 1, wherein said at least one hole is approximately parallel to a cage land surface.

5. The angular contact ball bearing of claim 1, wherein said bearing cage further comprises a hole connecting said annulus channel to said ball pocket for each of said ball pockets.

6. The angular contact ball bearing of claim 1, wherein said at least one hole connects said third annulus wall to said ball pocket wall such that a fluid can pass from said annulus channel to said ball pocket through said hole.

7. The angular contact ball bearing of claim 1, wherein said hole comprises a ball pocket opening in said ball pocket wall.

8. A method for lubricating an angular contact ball bearing comprising the steps of:
   injecting oil into an annulus channel, wherein said annulus channel includes a first wall approximately parallel a cage land surface, a second wall approximately parallel to a ball pocket wall, and a third wall angled relative to said cage land surface and angled relative to said ball pocket wall, said third wall being axially closer to said ball pocket wall than said second wall, relative to said axis defined by said bearing cage; and
   passing oil from said annulus channel into a ball pocket through a hole connecting said annulus channel to said ball pocket, thereby lubricating said ball pocket.

9. The method of claim 8, wherein centrifugal force causes oil to pass through said hole in said step of passing oil from said annulus channel into a ball pocket.

10. The method of claim 8, wherein said step of passing oil from said annulus channel into a ball pocket through a hole connecting said annulus channel to said ball pocket, thereby lubricating said ball pocket further comprises expelling oil from said hole into said ball pocket through an opening in said ball pocket wall.

11. The method of claim 10, wherein said opening is received directly in said ball pocket wall.

12. A ball bearing cage comprising:
    an annulus channel, wherein said annulus channel includes a first wall approximately parallel a cage land surface, a second wall approximately parallel to a ball pocket wall, and a third wall angled relative to said cage land surface and angled relative to said ball pocket wall, said third wall being axially closer to said ball pocket wall than said second wall, relative to said axis defined by said bearing cage;
    a plurality of ball pockets for holding ball bearing elements; and
    a plurality of holes, wherein each of said ball pockets is connected to said annulus channel via at least one of said holes.

13. The ball bearing cage of claim 12, wherein said bearing cage further comprises a cage land surface, and said cage land surface is interrupted only by said ball pockets and said annulus channel.

14. The ball bearing cage of claim 12, wherein each of said holes is angled relative to a cage land surface.

15. The ball bearing cage of claim 12, wherein each of said holes is approximately parallel to a cage land surface.

16. The ball bearing cage of claim 12, wherein at least one of said holes connects said third annulus wall to said ball pocket wall such that oil can pass from said annulus channel to said ball pocket through said hole.

17. The ball bearing cage of claim 12, wherein said hole comprises a ball pocket opening in said ball pocket wall.

* * * * *